3,177,749
CONTROL FOR FEEDING, MEASURING, AND CUTTING STRIP MATERIAL
Kenneth J. Best and Leonard W. Tiefel, Sharon, Pa., assignors to Westinghouse Electric Corporation, Pittsburgh, Pa., a corporation of Pennsylvania
Filed May 27, 1960, Ser. No. 32,160
3 Claims. (Cl. 83—208)

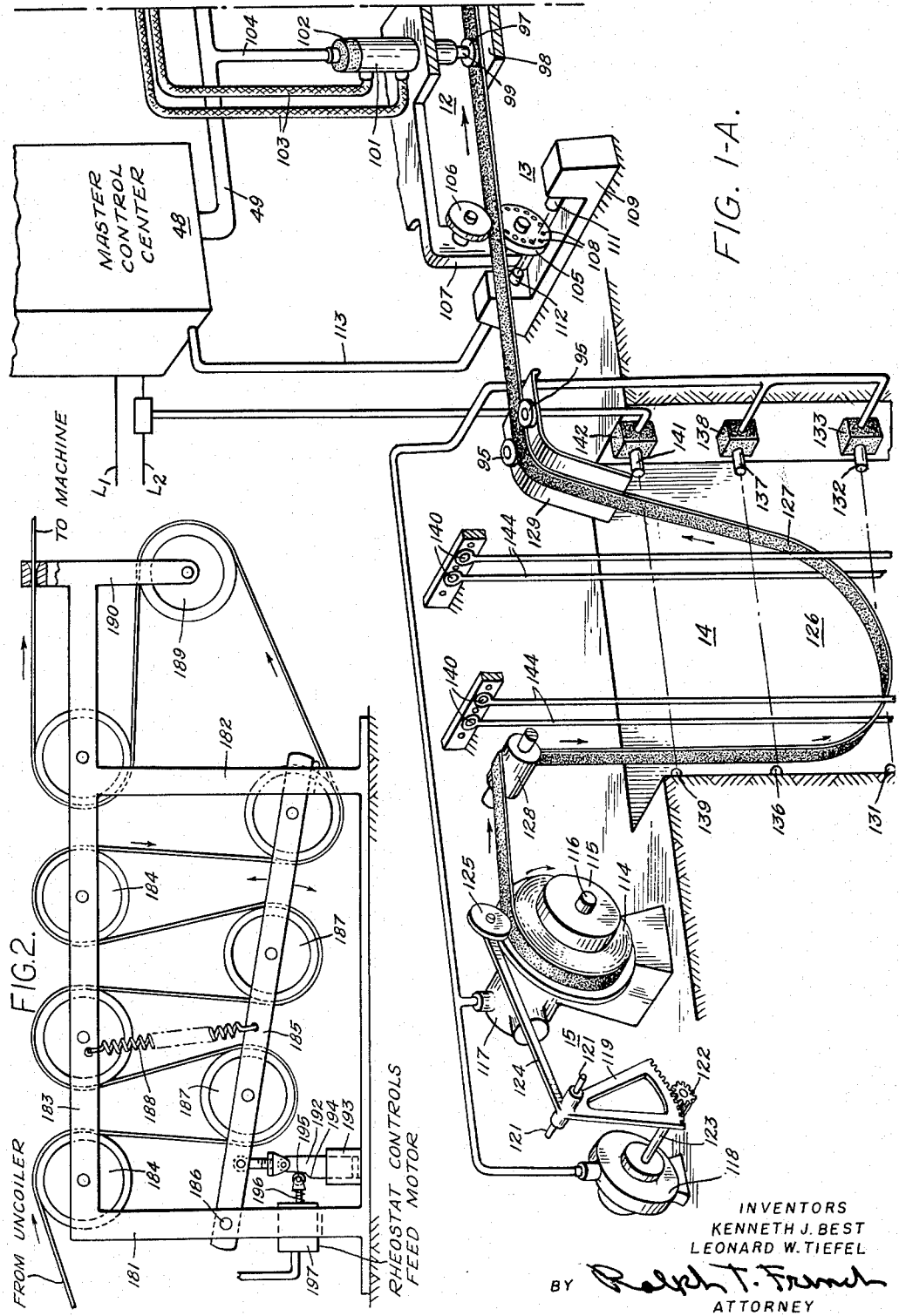

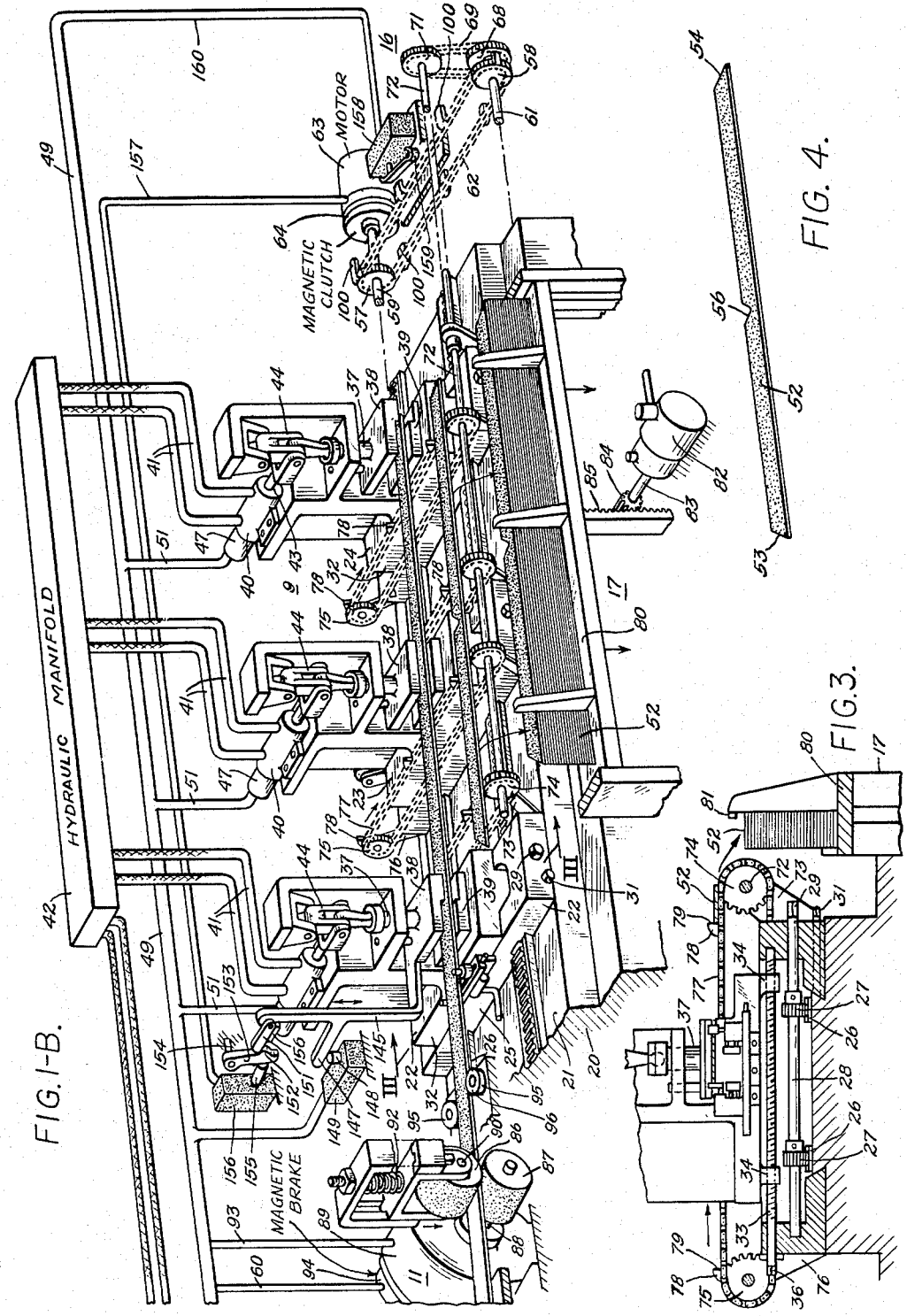

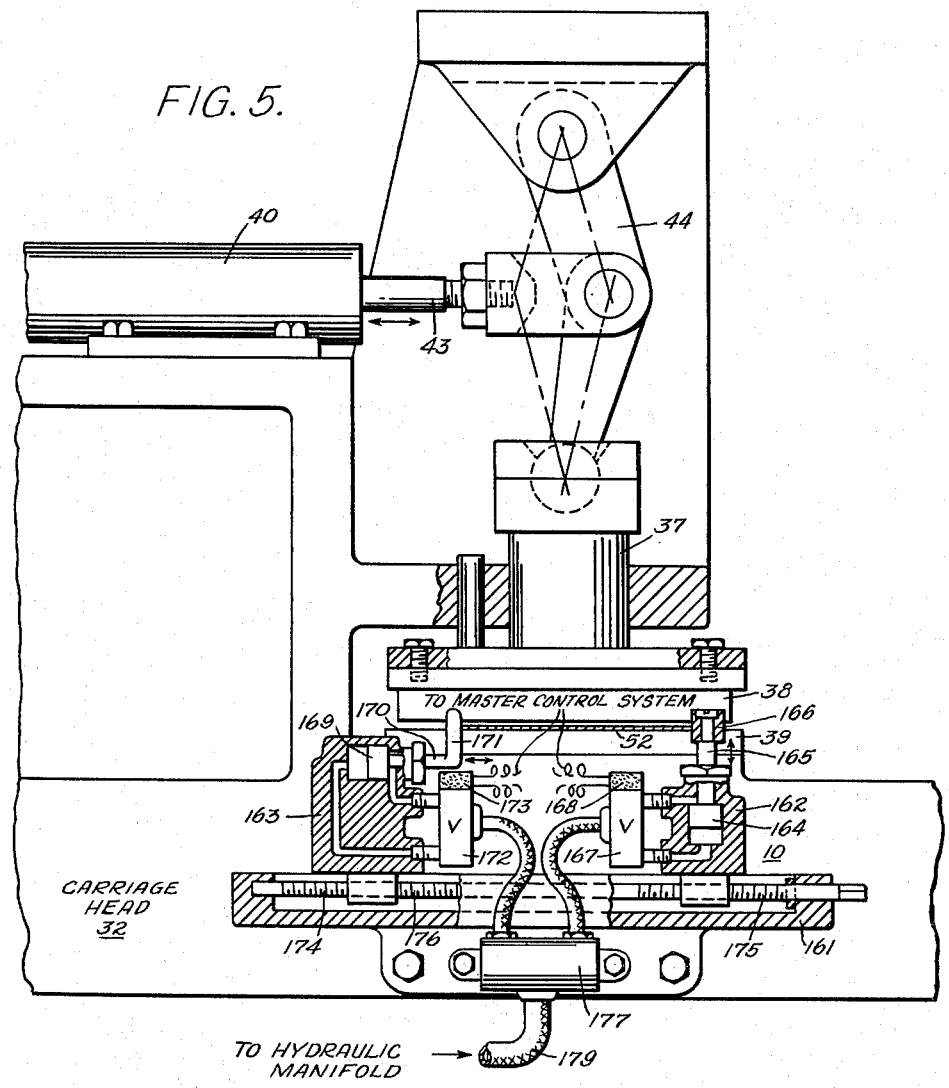

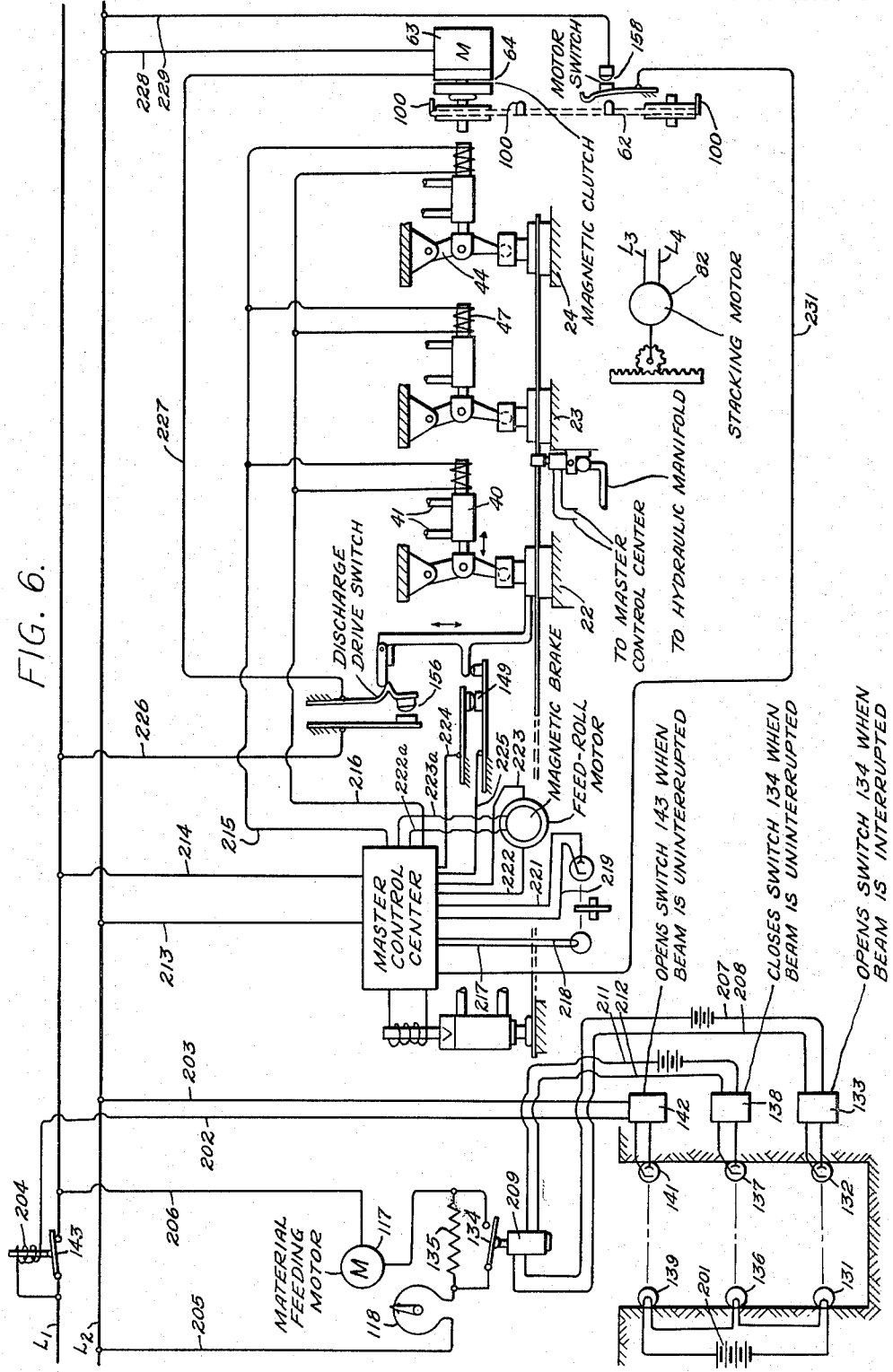

This invention relates to apparatus for working or forming and/or feeding material of strip form, and is particularly suited to feeding and working an elongated strip of relatively thin and flexible material supplied in coil formation.

More particularly, the invention provides interrelated apparatus for performing a series of steps of a process, including: feeding strip material from a coil to material-working mechanism, measuring the length of material fed, stopping the feed after a predetermined length of fed material has been measured, holding the material, operating the mechanism to perform work on the held material including shearing the worked material from the strip, and ejecting the worked material from the mechanism.

The present invention has been found to be especially satisfactory for high speed feeding and shearing of thin metallic strip material for core laminations for use in construction of electric power transformers. One suitable material for this purpose is "Hypersil" grain oriented silicon steel, .014 of an inch in thickness, and preferably provided on both surfaces with coatings of insulation, approximately .0002 inch in thickness. Preferably, the strip material for such core laminations is purchased in coil form, and of the correct width so that the only "forming" or "working" steps necessary are the punching of one or more V-shaped notches in one edge and shearing of the two ends to the desired outline.

An object of the present invention is to feed and work strip material at relatively high speeds, for example, in the order of one thousand linear feet per minute.

Another object of the invention is to so control the feed of strip material from a coil thereof to an accumulator, from which the material is withdrawn at a constantly varying rate, that the quantity of the material maintained within the accumulator is always between predetermined safe minimum and maximum values.

Yet another object of the invention is to feed and shear strip material at speeds in the order of one thousand feet per minute and with the feed having an accuracy in the order of .005″ to .010″ per foot of length.

These and other objects are effected by the invention as will be apparent from the following description taken in connection with the accompanying drawings, forming a part of this application, in which:

FIGS. 1-A and 1-B, taken together, are a schematic perspective view of apparatus for feeding and working strip material, constructed in accordance with the present invention;

FIG. 2 is a side elevational view of a modified accumulator;

FIG. 3 is a transverse view, partially in section, taken along the line III—III of FIG. 1-B, looking in the direction indicated by the arrows;

FIG. 4 is a plan view of a core lamination, herein illustrated as the member being formed by the material working mechanism of FIGS. 1-A and 1-B;

FIG. 5 is an enlarged side elevational view of a carriage head and associated material clamping mechanism; and FIG. 6 is a schematic wiring diagram for the apparatus of FIGS. 1-A—1-B.

Referring now to the drawings in greater detail, particularly to FIGS. 1-A and 1-B, the reference character 9 indicates, in its entirety, mechanism for performing work upon a strip of material. While it will become apparent that various types of work may be performed, for example, punching, shearing, drawing, forming, etc., the apparatus herein shown for illustrative purposes only is limited to shearing and punching operations.

Associated with the material working mechanism 9 are material guiding and clamping means 10, material feeding means 11, material holding means 12, material measuring means 13, a material accumulator 14 and a material uncoiler 15. In addition, there may be associated with the material working mechanism 9 material transfer means 16 for removing the worked material from the mechanism 9, and stacking mechanism 17 for stacking the worked material as it is removed from the working mechanism.

As best illustrated in FIGS. 1-B and 3, the material working mechanism 9 includes a bedplate 20 having a pair of longitudinally extending ways 21 which guide and support for longitudinal movement thereon a plurality of carriages, herein illustrated as three in number and identified as 22, 23 and 24. Each carriage includes a base 25 resting on, and guided by, the ways 21.

The bedplate 20 is provided on its upper surface with a pair of longitudinally extending racks 26 disposed in spaced parallel relation, the teeth thereof being adapted to mesh with teeth provided on corresponding pinions 27 (FIG. 3) carried by a transversely extending shaft 28 having a wrench-receiving terminal portion 29 projecting forwardly of the front face of each carriage base 25. By rotating shaft 28, the carriage associated therewith may be adjusted longitudinally of the bedplate 20 and retained in its adjusted position by tightening a set screw 31, also carried by the carriage base 25 and abutting against a surface of the bedplate 20 when tightened.

Each of the carriages 22, 23 and 24 is provided with a carriage head 32 which is adjustable transversely of the bedplate, relative to its respective carriage base 25. This transverse adjustment is effected by a screw 33 (FIG. 3) rotatably carried by the carriage base with its threaded portion cooperating with internal threads provided in bores of lugs 34 depending from the carriage head 32. Each screw 33 has a wrench-receiving terminal portion 36 projecting rearwardly from its carriage base 25 and rotation of the screw results in transverse feed of the carriage head relative to the base. If desired, each screw terminal portion 36 may have associated therewith a vernier disc, thereby providing for extremely accurate adjustment of the carriage heads.

Each carriage head includes a ram 37 mounted for vertical reciprocable motion. The lower end of each ram 37 supports a punch 38 adapted to cooperate with a die 39, fixedly secured to the carriage head therebelow.

Each carriage head also includes a hydraulic cylinder and valve construction, indicated schematically at 40, to which hydraulic actuating fluid is directed and withdrawn via conduits 41 connected with a hydraulic manifold 42. The hydraulic piston 43 of each cylinder 40 operates through toggle mechanism 44 to reciprocate vertically the associated ram 37, in a manner well known in the art. An electric valve actuator 47 is associated with each hydraulic cylinder and valve combination, each electric valve actuator being connected with a master control center 48 by electric current carrying wires (not shown) housed within a main conduit 49 and branch conduits 51.

For purposes of illustration, the material herein being fed and worked is indicated as relatively thin strip metal in the order of .014 of an inch thickness and of a width of about six inches. This material, herein illustrated by way of example only and not by way of limitation is utilized in forming core laminations 52, of the shape shown in FIG. 4. It will be noted that the laminations have beveled ends 53 and 54 and a V-shaped notch 56 in one side, intermediate the ends thereof. This particular core lamination illustrated in FIG. 4 requires three operations, a shearing operation at each end to produce the bevels 53 and 54 (the shearing operation at 53 also separating the lamination from the remainder of the strip), and a punching operation to provide the notch 56. Thus, three carriages are required for producing this particular lamination. However, it will be apparent that laminations or other members of different shapes and forms may be provided with equal facility, but requiring a greater or lesser number of carriages depending upon the number of locations at which operations on the strip are to be performed.

In order to remove the finished lamination from the material working mechanism 9, there is provided the transfer means 16, previously mentioned, which includes a pair of transversely spaced rear and front sprockets 57 and 58, respectively, carried by rear and front shafts 59 and 61, respectively. An endless chain 62 is carried by the spaced sprockets 57 and 58. An electric motor 63 drives the rear shaft 59 through a magnetic clutch 64 which is rendered effective periodically, with the result that the chain is intermittently moved in a clockwise direction, as viewed in FIG. 1–B, by intermittent operation of the magnetic clutch 64 in response to control means to be described later. The transfer mechanism motor 63 receives electrical energy via wires (not shown) housed in the main conduit 49 and in a branch conduit 160.

The shaft 61, on which the front sprocket 58 is secured, also has secured thereon a sprocket 68 which is drivingly connected through a chain 69 with a sprocket 71 secured on a shaft 72 which extends longitudinally of the bedplate, in front of the carriages. The shaft 72 is rotatably supported in brackets 73, secured to the carriage bases 25 and has fixed thereon a plurality of sprockets 74 connected by endless chains 77 to aligned rear sprockets 75 supported on brackets 76. Each chain 77 carries a plurality of spaced dogs or fingers 78 each having a vertical face 79 (FIG. 3) extending normal to the top run of each chain and facing in the direction of movement of the top run. Inasmuch as each chain 77 moves in a general clockwise direction, as viewed in FIGS. 1–B and 3, and inasmuch as the upper run of each chain is positioned just beneath the strip of material forming the core lamination 52, movement of the chain upper run transversely of the bedplate and of the core lamination results in the finished lamination being moved forwardly by engagement of dogs 78 with the rear edge thereof. As best shown in FIG. 3, each finished lamination 52 is fed by the chains 77 to the stacker 17.

The stacker 17 includes a vertically-adjustable work-receiving support 80 which, when the stacker is empty, is at its maximum height, approximately level with the front shaft 72 of the transfer means. In that position it readily receives the finished core laminations 52 as they are discharged by the dogged chains 77.

As the stack of laminations increases in thickness to a predetermined level, the top lamination will contact a microswitch 81 (FIG. 3) which momentarily energizes a motor 82 whose shaft 83 carries a gear 84 in mesh with a vertical rack 85 supporting the work-receiving support 80. This momentary energization of the motor 82 produces a slight lowering of the support 80 and the stack of laminations thereon. This moves the top lamination out of contact with the microswitch 81, thereby deenergizing the motor and immobilizing the support until a few additional laminations added to the stack again contact and close switch 81 and effect further lowering of the support 80.

While the means herein illustrated for lowering the support 80 is a rack and gear mechanism, it will be apparent that other mechanisms could be utilized, for example, hydraulic cylinders and pistons.

The feeding means 11 for advancing the material through the material working mechanism 9 comprises rubber coated upper and lower feed rolls 86 and 87, respectively. The lower roll 87 is secured to the shaft 88 of a motor 89, preferably one adapted to run at 650 r.p.m. The upper roll 86 is mounted on a shaft 90, carried by suitable support means 91 and is biased against the lower roll 87 by a compression spring 92. Suitable A.C. current supply is furnished the motor from the master control center 48 via the main conduit 49 and a branch conduit 93. The two rolls frictionally engage the strip material to feed the latter to the material working mechanism 9. At the rear end of the motor shaft 88 is mounted a magnetic brake 94 for stopping rotation of the motor rotor when the supply of current thereto is interrupted. Control of the brake 94 is effected from the master control center 48 by wires housed in main conduit 49 and a branch conduit 60.

Preferably, suitable means are provided for guiding the strip material after it leaves the feed rolls, and in the construction herein illustrated these means comprise a pair of camber guides or rolls 95, freely rotatable about vertical axes at opposite sides of the strip and having upper peripheral flanges 96 which overlie the opposite edges of the strip to retain it between said guides or rolls. It has been found desirable to provide similar pairs of camber guides or rolls at one or more other points along the path of travel of the strip of material, as will be mentioned hereinafter.

The invention contemplates the provision of means (in addition to the motor brake 94) for holding the strip of material to insure that it does not move longitudinally while the feed rolls are stopped and the work performing punches are operating on the strip material. The holding means 12 (FIG. 1–A) includes a clamping disc 97, preferably rubber coated on its lower face and adapted to be forced downwardly to clamp the strip against a suitable stationary supporting surface 98 therebeneath. The clamping disc 97 is carried at the lower end of a hydraulic ram 99, reciprocable in a combined cylinder and valve structure 101 having associated therewith an electric valve actuator 102. Hydraulic fluid for the hydraulic cylinder and valve combination is conducted from and to the hydraulic manifold 46 by a pair of fluid conduits 103. Electric control current is directed to the electric valve actuator 102 from the master control center 48 by wires housed in the main electrical conduit 49 and in a branch conduit 104.

The measuring means 13, illustrated schematically in FIG. 1–A includes a counter wheel 105 positioned beneath the strip of material being fed, with its periphery, which is preferably rubber coated, in contact with the under surface of the fed strip. A pressure wheel 106, likewise rubber coated, engages the upper surface of the strip directly over the pressure wheel to insure frictional engagement of the strip with the counter wheel. Both wheels are rotatably supported by suitable shaft structure carried by a fixed support 107.

The counter wheel 105 is provided with a circular series of holes 108, concentric about the axis of rotation of the wheel. A fixed support 109 carries a light source 111 and a light sensitive element 112, disposed at opposite sides of the counter wheel, atnd so positioned and aligned that a beam of light passes from the light source 111 to the light sensitive element 112 through the holes 108 as the counter wheel is rotated by travel of the strip material thereover. The counter wheel 105 may have any preselected number of openings 108 therein, although preferably this number should not exceed 50. Assuming that there are 50 holes in the circular series and that the wheel has an effective periphery of ten inches, it will be apparent that the light beam will be broken five times during each inch of travel of the strip, with the result that each impulse of the light sensitive element 112 represents .200 inch of travel of the strip material.

These impulses received by the light sensitive element 112 are transmitted by wires, housed in a conduit 113, to the master control center 48 where suitable electronic control apparatus counts the number of impulses received and, when a predetermined number of such impulses are received, which correspond to the travel of the strip of material sufficient to provide a new core lamination 52 in the material working mechanism 9, sends an electrical signal or impulse to the feed roll motor 89 to stop the latter and a signal to the magnetic brake 94 to energize the same, thereby stopping the feed of the material. At the same time, an impulse is sent to the electric valve actuator 102 of the clamping means 12 to actuate the valve thereof and to admit hydraulic fluid to move the ram 99 and its clamping disc 97 downwardly to clamp the strip against the fixed support 98. Also, at the same time, the electronic control sends control electrical impulses to the electric valve actuators 47 of the three carriages 22, 23 and 24, thereby effecting actuation of the rams of these three carriages, resulting in interaction of the dies and punches of these three carriages to perform the desired work on the strip to produce a core lamination 52.

As previously mentioned, the strip material is usually furnished in coils of the desired width, and in FIG. 1–A there is shown schematically an uncoiler 15 for feeding the strip material from such a coil 114. This coil is mounted on an arbor 115 secured on a rotatable shaft 116 whose rotation is effected by a variable speed electric motor 117, variation of the speed of this motor being effected by a rheostat 118 in the electrical circuit to the motor 117. It will be apparent that, if the motor 117 and the arbor 115 driven thereby were rotated at a constant speed, the rate of feed of the strip material therefrom would gradually decrease as the diameter of the coil decreased, due to the decrease in effective periphery of the coil. Accordingly, the present invention includes means for maintaining the rate of feed of the strip material from the coil 114 substantially constant, regardless of changes in its diameter and hence in its periphery.

To this end, there is provided a toothed sector 119 mounted, as at 121, for limited pivotal movement about an axis normal to the plane of the sector. The teeth at the periphery of the sector 119 drivingly engage the teeth of a gear 122 secured on the shaft 123 of the rheostat. Accordingly, pivotal movement of the sector 119 about its pivotal support at 121 effects adjustment of the rheostat to vary the resistance thereof and, consequently, to vary the speed of the uncoiler motor 117. The sector 119 has fixedly secured thereto an arm 124 whose free end carries a roller 125 which rests upon the upper surface of the coil 114 of strip material. It is believed clear that, as the diameter of the coil 114 decreases as the material is fed therefrom, the roller 125 and the associated arm 124 will move downwardly in a clockwise direction with respect to the axis of the sector 119, thereby turning the gear 122 and the rheostat shaft 123 in counterclockwise direction. The rheostat is so constructed that such counterclockwise rotation of its shaft 123 decreases the resistance which the rheostat places in the electrical circuit to the motor 117, with the result that the latter increases its rate of rotation with consequent increase in the rate of rotation of the coil 114, this increase being such as will maintain the rate of feed of material from the coil substantially constant.

It will be apparent that, since the material feeding device 11 is operated intermittently a great many times per minute while the uncoiler 15 is operating at a substantially constant rate of feed, it is desirable to provide an accumulator, such as indicated at 14, to maintain or store a predetermined excess of the material which excess will constantly vary as the feed means 11 operates and pauses.

In accordance with the present invention the accumulator 14 (FIG. 1–A) includes a pit or well 126 for receiving a free hanging loop 127 of the strip material, between the uncoiler 15 and the feeding means 11. The entering end of the loop 126 is supported by a suitable roller 128 while the leaving end of the strip is supported by a guide plate 129. As previously indicated, camber guides or rolls 95 are desirable at other positions than that previously described as being between the feeding means 11 and the work performing means 10. It has been found that another desirable location for such guides or rolls is at the exit from the accumulator pit or well 126 and a pair of such rolls are schematically illustrated at this location.

In order to maintain the length of the loop 127 of the strip material within the well 126 between suitable limits, there is provided an electronic control including a light source 131 and a light sensitive element 132 at opposite ends of the well and in alignment and both near the bottom of the well. If the material is being fed to the well more rapidly than is being withdrawn therefrom, with the result that the bottom of the loop descends sufficiently far to interrupt the beam of light from the light source 131 to the light sensitive element 132, such interruption operates through an electronic control 133 to open a switch 134 (FIG. 6) which, when closed, bypasses a resistor 135 in series with the rheostat 118. With the switch 134 open, the resistor 135 becomes effective to decrease the current passing to the uncoiler motor 117, thereby slowing down the latter with consequent decrease of the rate of feed of strip material to the accumulator.

This reduction in rate of feed of material to the accumulator results in the length of the loop in the pit gradually decreasing until it rises to a point where it no longer interrupts a beam of light passing from a light source 136 to a light sensitive element 137, positioned in alignment at opposite ends of the pit a substantial distance above the previously mentioned light source and light sensitive elements 131 and 132, respectively. When the loop material is shortened to the extent that the beam between the light source 136 and the light sensitive element 137 is uninterrupted, an electronic control 138 actuated thereby effects closing of the switch 134, thereby shunting the resistor 135 and increasing the amount of current reaching the uncoiler motor 117, with consequent increase in the speed of the latter and consequent increase in the rate of feed of strip material to the accumulator. This increased rate of feed will result in gradual lengthening of the loop of material in the accumulator until the lower beam between the light source 131 and light sensitive element 132 is again interrupted. Thus, it will be apparent that the rate of feed of material to the accumulator will be constantly varying as the length of the loop fluctuates between the two predetermined limits as set by the vertical spacing of the two light sources and their associated light sensitive elements.

In the event that something should go wrong with the controls just described, or with the feeding means 11 or the uncoiling means 15, there is provided a safety control for shutting down the entire apparatus herein disclosed, in response to decrease in the length of the loop stored in the accumulator to a dangerously low value. Near the top of the pit there is provided a light source 139 and an aligned light sensitive element 141 on opposite end walls of the well 126. The light source therebetween is normally interrupted by the existence of loop 127 in the accumulator well, but should the amount of loop material stored become dangerously low, the bottom of the loop will be raised to a level where it no longer interrupts the beam between the light source 139 and the light sensitive element 141. Since this light beam is no longer interrupted, an electronic control 142 associated with the light sensitive element 141 will function to open a line switch 143 in the main power line L1, thereby cutting off all current to all of the electrically operated elements of the entire system.

In order to limit side sway of the loop 127 within the pit 126, so that the light beams from light sources 131, 136 and 139 will not be exposed when they should be broken by the loop, two pairs of rods 144 hang freely from pivotal mounts at their upper ends, as at 140. The rods 144 engage opposite edges of the loop of material and bias the loop into correctly centered position within the pit.

Referring now to FIG. 1–B, it will be seen that the punch 38 of carriage 22 carries a bracket 145 which is vertically reciprocable with its associated punch 38. This bracket 145 includes a pair of vertically-spaced upper and lower arms 146 and 147, respectively. When the hydraulic ram 37 and the punch 38 of the carriage 22 are in their upper retracted position, the lower arm 147 barely engages an actuator knob or button 148 of a normally closed switch 149 which controls supply of current to the feed roll motor 89. As soon as the ram and punch have moved downwardly appreciably, the arm 147 will have opened the switch 149, thus assuring that no current can reach the motor to drive the feed rolls during operation of the material working mechanism 9. It should be understood that this control of the feed motor current supply is supplementary to the primary control of this motor in response to counting action of the strip measuring means 13, previously described. Opening of the switch 149 becomes important only in the event the primary control fails for any reason.

The upper arm 146 of the bracket 145 pivotally supports a dog 151. This dog normally lies along the upper surface of the upper arm with its free end projecting beyond the free end of the arm. The pivotal connection of the dog to the arm is such that the dog can pivot through an arc which is less than 90 degrees only.

During downward movement of the bracket 145, the dog pivots sufficiently to allow it to pass a projection 152 on a latch 153 which is pivoted on a fixed support, as at 154. As soon as the dog 151 has passed to a position below the latch projection 152, it will fall back by gravity to the horizontal position shown, where it rests on the horizontal upper arm 146.

Upon the return, or upward, stroke of the bracket 145, the free end of the dog 151 slides against and over the latch projection 152, thereby pivoting the latch clockwise as viewed in FIG. 1–B, thus depressing an actuator knob or button 155 to close a switch 156.

Closure of the switch 156 energizes the magnetic clutch 64 of the transfer mechanism 16 via wires housed in a conduit 157 to transmit motion from the motor 63 to the dogged chains which transfer the finished core lamination from the strip working mechanism 9 to the stacker 17. The latch projection 152 has sufficient contact surface for engagement by the dog 151 to insure energization of the magnetic clutch for the period of time necessary to effect the desired operation of the transfer mechanism 16.

A normally open switch 158 (FIG. 1–B) has an actuator finger 159 positioned to be engaged by lugs 100 spaced along the endless chain 62. Just prior to termination of each actuation of the transfer mechanism 16, a lug 100 will engage and close the switch 158. Closing of the switch 158 sends an electrical signal to the master control center 48 via wires housed in the main electrical conduit 49 and in a branch conduit 160. This signal results in the master control restarting the feed motor 89.

The material guiding and clamping means 10 is shown schematically in FIG. 1–B in association with the carriage head 22 only, in order to clarify the disclosure of that figure. However, in actual practice it has been found desirable to utilize such guiding and clamping means in association with each of the carriage heads 22, 23 and 24.

Reference is made to FIG. 5, wherein one form of material guiding and clamping mechanism 10 is illustrated. A base 161 is bolted, or otherwise secured, to the approach side of the carriage head 32, considered in the direction of feed of material to the head. This base slidably supports front and rear cylinder bodies 162 and 163, respectively, for movements in directions transversely of the strip of material. A piston 164 is arranged to reciprocate vertically in the cylinder body 162, and carries at the upper free end of its rod 165 a material guiding and clamping roller 166. A hydraulic valve 167 controls actuation of the piston 164 and positioning of the roller 166. An electric valve actuator 168 controls the valve 167 in response to signals of the master control center 48.

Similarly, a piston 169 is arranged to reciprocate horizontally in the cylinder body 163 and carries at the outer free end of its rod 170 a vertically extending material guiding and clamping finger 171. A valve 172 controls actuation of the piston 169 and an electrical valve actuator 173 controls the valve 172 in response to signals from the master control center 48.

During such times as material is being fed to the material working mechanism 9, the pistons 164 and 169 are in their retracted positions with the roller 166 below the level of the strip of material and the finger 171 spaced laterally from the strip of material. At substantially the same time that the master control center stops the feed motor 89, it also energizes the valve actuators 168 and 173 to adjust the roller 166 and the finger 171 into guiding and clamping engagement with the strips of material. Actually, the roller 166 moves up a fraction of a second before the finger 171 moves into its clamping position. This difference in time of movement of the roller 166 and of the finger 171 may be effected by the master control center, or may result from design of the hydraulic valves. At the time that the feed roll motor is started, the pistons 164 and 169 are retracted to release the material.

It will be noted that the cylinder bodies 162 and 163 may be adjusted toward or away from each other simultaneously by rotation of an adjusting screw 174 having oppositely threaded portions 175 and 176. This adjustment provides for clamping of varying widths of material. The cylinder bodies 162 and 163 are so related that their material guiding and clamping members 166 and 171 are always centered relative to the center line of the strip of material.

The hydraulic valves 167 and 172 are connected to a hydraulic cylinder 177 by conduits 178 whose flexibility allows for the above-mentioned adjustability. A conduit 179 supplies hydraulic fluid from the main hydraulic manifold 46 to the cylinder 177.

*Operation*

When the user desires to operate the mechanism herein previously described, he will adjust the bases of the carriages 22, 23 and 24 longitudinally of the bedplate 20 to effect the desired spacing of the punching and shearing operations with respect to the strip of material to be fed thereto. This longitudinal adjustment is effected, as previously explained, by loosening the set screws 31 and by turning the shafts 28 by application of a wrench or other suitable tool to the heads 29 thereof. When the proper longitudinal adjustment has been effected, the set screws 31 will be tightened.

Adjustment of the carriage heads 32 transversely of the bedplate 20 is effected by application of a suitable wrench or tool to the heads 36 of the transverse screws 33, thereby moving the carriage heads transversely relative to the bedplate. It is assumed that suitable punches 38 and dies 39 have already been set up in the various heads to perform the desired punching, shearing or other material working operations.

A coil 114 of the strip material is secured on the arbor 115 of the uncoiler 15 and a sufficient portion thereof unwound to provide a loop 127 extending into the pit or well 126 and therefrom through the measuring means 13, the holding means 12 and the feed rolls 86 and 87, to and through the material working punches and dies and the associated guiding and clamping means 10.

Preferably, a first core lamination will be formed and sheared by hand control of the apparatus through a suitable manual control (not shown) and the electronic control housed in the master control center 48 will be adjusted to stop the feed and operate the punches when the desired length of material has been measured by the measuring means 13. Thereafter, the entire system will be started up on automatic control by a suitable master switch associated with the master control center. Once the system is running automatically, the uncoiler motor 117 will drive the arbor 115 to unwind the strip material from the coil 114 and to feed it into the well or pit 126 in the form of a loop 127. As previously explained, the roller 125 at the free end of the arm 124 will gradually lower as the diameter of the coil 114 decreases due to feed of material therefrom, and this lowering of arm 124 will pivot the toothed segment 119 about its axis 121 to vary the adjustment of the rheostat 118. This adjustment is such as to decrease the resistance of the rheostat, which is in the circuit to the uncoiler motor 117, and this reduction in resistance will effect increase in speed of the motor and of the arbor with the result that the linear feed of material from the coil 114 is maintained substantially constant.

The light sources 131 and 136, on an end wall of the accumulator well 126, cooperate with the light sensitive elements 132 and 137, respectively, on the opposite end wall of the well 126, to operate through the electronic controls 133 and 138 to vary the rate of feed of material from the coil 114 so as to maintain the loop 127 in the accumulator between predetermined limits.

As the strip material passes through the measuring means 13, its frictional engagement with the rubber coated periphery of the counter wheel 105 causes the latter to rotate and as it rotates the web portions between the holes 108, provided in an annular series through the counter wheel, will intermittently break a light beam normally passing from the light source 111 to the light sensitive element 112. Each interruption of this light beam directs an electrical signal to the master control center where suitable electronic counting mechanism adds up the number of impulses received from the measuring means and, upon counting a predetermined number of impulses which correspond to the length of material to be fed to the material working mechanism 9, functions to perform a number of controlling actions.

These controlling actions occur substantially simultaneously and comprise operating the electric valve actuators 47 of the hydraulic valves and cylinders 40 carried by the three carriages 22, 23 and 24, to initiate reciprocation of the rams 37 and the punches 38 to perform work on the strip. A signal is simultaneously sent to the electric valve actuator 102 of the hydraulic piston 101 in the clamping mechanism 12 to cause the ram 99 thereof to move downwardly and clamp the strip material between the clamping disc 97 at the lower end of the ram and the support 98 at the opposite side of the strip material. A further control operation performed at the same time by the master control center is to stop the feed roll drive motor 89 by terminating the supply of current thereto and simultaneously energizing the magnetic brake 94 to positively prevent rotation of the motor shaft. Also, signals are transmitted to the valve acuators 168 and 173 of the material guiding and calmping means 10, thereby actuating the valve 167 and 172 to move the roller 166 and finger 171 into engagement with the strip of material at locations adjacent each set of dies and punches.

During downward movement of the punches 38, the bracket 145, carried by the punch of carriage 22, is likewise moved downwardly and its lower arm 147 opens the normally closed switch 149 to additionally interrupt the circuit to the feed roll motor 89, as a safety precaution in the event of malfunction of the normal control for that motor.

During return or upward movement of the bracket 145 carried by the punch of the carriage 22, the dog 151 on the upper arm 146 of the bracket biases the latch 153 clockwise to momentarily energize switch 156 which, in turn, actuates the magnetic clutch 64 of the transfer mechanism 16. Thus, as the punches 38 move upwardly out of contact with the strip material, the ejector mechanism 16 functions through the motor 63 and magnetic clutch 64, to advance the endless chain 62 and through the shaft 61, endless chain 69 and sprockets 68 and 71 and shaft 72, to advance the transfer chains 77 relative to the core lamination 52 which has just been formed. During this forward movement of the chains, one set of dogs 78 will engage the rear edge of the core lamination and move it forwardly out from under the punches and discharge it onto the stacker 17.

As the endless chain 62 of the transfer mechanism 16 approaches the forward limit of its movement, one of its lugs 100 momentarily closes switch 158 by contact with the switch closing finger 159, thereby signalling the master control center to energize the feed roll motor 89, release the magnetic brake 94, release the clamping member 97 of the holding means 12, and release the clamping means 10, thereby initiating a new cycle of operation.

As previously explained, the cycle as just described will be repeated in the order of 60 times a minute with the material being fed at an average rate of about 1000 feet a minute. It will be appreciated that handling material of this character at speeds of 1000 feet a minute is an exceptional improvement over prior mechanisms for handling material of this type, which mechanisms have operated at a linear feed rate of 350 to 400 feet per minute, at best.

While the accumulator 14, shown in FIG. 1–A and previously described, is the presently preferred construction for this type of device, it has been found that an accumulator such as shown in FIG. 2 may be suitable under certain conditions. The accumulator of FIG. 2 includes a pair of spaced frame members 181 and a similar pair of spaced frame members 182, the two pairs of frame members being connected at their upper ends by horizontally extending spaced frame members 183. A plurality of rollers 184 are rotatably mounted between the pair of spaced horizontal frame members 183. A pair of parallel spaced arms 185 are pivotally mounted, as at 186, between the two vertical end frame members 181, and these arms pivotally support a plurality of rollers 187 therebetween. A plurality of coil springs 188 at least partially support the weight of arms 185 and of their lower rollers 187. The strip material from the uncoiler is woven back and forth between the upper and lower rollers 184 and 187, respectively, to store an excess of material. If desired, to provide additional storage, a roller 189 may be mounted on an extension 190 of the horizontal frame members 183 and the strip material after leaving the last lower roll may pass thereover and then around the last roller of the upper series of rollers and thence to the remaining mechanism of the system. Inasmuch as the strip material is fed to this accumulator 180 at a substantially constant rate and is withdrawn therefrom by the feeding means 11 intermittently, or by jerks, the rapid variations in the quantity of material stored in the accumulator are accommodated by vertical movement of the pair of arms 185 carrying the lower rollers 187, relative to the upper rollers 184. It will be apparent that, as material is suddenly withdrawn from this accumulator, the arms 185 will be raised to accommodate the reduced quantity of material in the accumulator. As the feed to the material working mechanism 9 is stopped by interruption of the feed roll motor 89, no material will be withdrawn from the accumulator momentarily, but material will still be fed thereto continuously from the uncoiler 15, with the result that the amount of material stored in the accumulator will momentarily increase, and the pivotal arms 185 and their rollers 187 will be lowered relative to the rollers 184 to accommodate the increased amount of material temporarily stored in the accumulator.

In order to prevent wide fluctuations in the movements of the lower rollers relative to the upper rollers, the arms 185 have connected thereto a vertically movable cam member 192 which reciprocates in a guide 193. This cam member 192 has an inclined cam face 194 which works against a cam follower 195 biased thereagainst by spring 196. This cam follower 195 is connected with means 197 for adjusting the rheostat 118 of the uncoiler motor 117 (FIG. 1–A), or it may adjust an additional rheostat (not shown) connected in series with the rheostat 118. The cam surface 194 is so designed that, as the arms 185 and the lower rollers move upwardly due to decrease in the amount of material in the accumulator, the rheostat will be adjusted to speed up the uncoiler motor 117, thereby increasing the rate of feed of material to the accumulator, thus increasing the quantity of material in the accumulator and resulting in lowering of the lower rollers relative to the upper rollers. Conversely, when an excess of material is stored within the accumulator, the resulting downward movement of the arms 185 and of the cam surface 194 results in adjustment of the rheostat in the opposite direction to decrease the speed of the motor 117 and to consequently decrease the rate of feed to the accumulator and the amount of material stored therein, thus raising the arms 185 and their lower rollers 187 relative to the upper rollers 184.

It will be appreciated that to show in FIGS. 1–A and 1–B all of the wiring necessary to effect the control functions described heretofore, would render these figures unintelligible. Accordingly, FIG. 6 has been provided, which constitutes a schematic diagram of the wiring for the apparatus shown in FIGS. 1–A and 1–B. In this figure, parts corresponding to those shown in FIGS. 1–A and 1–B have been given the same reference characters.

Referring briefly to FIG. 6, it will be seen that the electrical wiring is connected with a suitable source L1, L2 of electric current, the line L1 having the line switch 143 which, as previously described, is adapted to be opened by the electronic control 142, energized by establishment of a light beam between light source 139 and light sensitive element 141. This light source as well as light sources 136 and 131, which are also associated with the accumulator 126, are provided with a suitable power source 201. Wires 202 and 203 serve to operate a solenoid 204 for opening the line switch 143 by means of the electronic control 142.

Wires 205 and 206 provide an electrical circuit for the uncoiler motor 117, via the rheostat 118 and the resistance 135 in series therewith, or via the rheostat and the shunt through switch 134. It will be apparent that opening of the line switch 143, in the event of failure of any portion of the system, will interrupt the circuit to the uncoiler motor 117.

Wires 207 and 208 provide a circuit from the electronic control 133 to a solenoid 209 which operates the shunting switch 134 and, similarly, wires 211 and 212 provide a circuit from the electronic control 138 to reverse the operation of the solenoid 209, the operation of these controls and solenoid having been described previously.

Wires 213 and 214 provide a main power source for the master control center 48, while wires 215 and 216 conduct electric power from the master control center to the valve actuators 47 of the carriages 22, 23 and 24.

Wires 217 and 218 provide a circuit for powering the light source 111 of the measuring means 13 and wires 219 and 221 conduct signals from the light sensitive source 112 to the master control center to initiate the operation of the valve actuators 47 of the carriage rams, the valve actuators 102 of the holding means 12, and the valve actuators 168 and 173 of the material guiding and clamping means 10.

Wires 222 and 223 provide a circuit for conducting current to the feed roll motor 89 during its normal operation, and wires 222a and 223a conduct current to energize the magnetic brake 94 when the motor 89 is de-energized. Wires 224 and 225 provide a control circuit operated by the switch 149 to provide the safety feature of positively preventing flow of current to the motor 89 during operation of the punches.

An electric circuit for operating the electric motor 63 of the transfer means 16 is provided by wire 226, switch 156, wire 227 and wire 228.

The electrical signal furnished to the master control center 48 by momentary closure of switch 158 by a lug 160 on the endless chain 62 has a circuit through wire 229, switch 158 and wire 231.

In this schematic wiring diagram the stacking motor 163 is illustrated as having its own separate power source L3, L4 which, in actual practice, might be a portion of the main supply conduits L1 and L2.

It is believed clear from the preceding description and explanation that applicant's invention provides novel mechanisms for performing rapidly and accurately one or more material forming operations, such forming operations including all conventional material working steps such as punching, drawing, forming, shearing, etc., and for feeding the material to the material-forming mechanism.

While the invention has been shown in several forms, it will be obvious to those skilled in the art that it is not so limited, but is susceptible of various other changes and modifications without departing from the spirit thereof.

What is claimed is:

1. In apparatus for feeding strip material at high speed and for cutting said material into predetermined lengths, means for rotatably supporting a coil of strip material to be fed and cut, means for rotating the coil to feed strip material therefrom, means for increasing the speed of rotation of the coil as the diameter thereof decreases to maintain the rate of feed of the material uniform, means for accumulating a variable length of the material as it is fed from the coil, means operable in response to changes in the length of material stored in said accumulating means for momentarily changing the speed of rotation of the coil to tend to maintain the stored length constant, means spaced from the accumulating means for shearing pieces of material from the free end portion of the strip of material, a pair of cooperating feed rolls for withdrawing strip material from the accumulating means and for feeding said material to the shearing means, driving means for said feed rolls, a magnetic brake on said driving means, means for momentarily holding the fed strip stationary, and means responsive to feeding of a predetermined length of strip material for applying said magnetic brake for stopping the feed roll driving means and for rendering effective the holding means and the shearing means.

2. In apparatus for feeding strip material at high speed and for cutting said material into predetermined lengths, means for rotatably supporting a coil of strip material to be fed and cut, means for rotating the coil to feed strip material therefrom, means for increasing the speed of rotation of the coil as the diameter thereof decreases to maintain the rate of feed of the material uniform, means for accumulating a variable length of the material as it is fed from the coil, means operable in response to changes in the length of material stored in said accumulating means for momentarily changing the speed of rotation of the coil to tend to maintain the stored length constant, means spaced from the accumulating means for shearing pieces of material from the free end portion of the strip of material, a pair of cooperating feed rolls for withdrawing strip material from the accumulating means and for feeding said material to the shearing means, driving means for said feed rolls, means for disabling said driving means in case the material in said accumulating means is not a predetermined length, means disposed between said accumulating means and said shearing means for measuring the length of strip fed past a check point, and means responsive to such measurement of a predetermined length for applying a magnetic brake for momentarily stopping the feed roll driving means and rendering effective the shearing means.

3. In apparatus for feeding strip metal and for cutting said strip metal into predetermined lengths, means for rotatably supporting a coil of such strip metal, means for feeding the strip metal from the coil, means for temporarily accumulating and storing a variable length of the strip metal as it is fed from the coil, means operable in response to changes in the length of material stored in said accumulating and storing means for changing the speed of rotation of the coil to maintain the stored length between predetermined limits, reciprocable means spaced from the accumulating and storing means for shearing pieces of strip metal from the free end of the strip, a pair of cooperating feed rolls frictionally receiving the strip therebetween, means for driving said feed rolls to withdraw strip metal from the accumulating means and feed it to the reciprocable shearing means, a magnetic brake for said feed roll drive means, means for intermittently clamping the strip against movement, means disposed between said accumulating and storing means and said shearing means for measuring the strip, said measuring means initiating reciprocable movement of the shearing means, energizing said magnetic brake to stop the feed roll driving means and energizing the clamping means after measuring a predetermined length of strip, and means operable between completion of the shearing movement of the shearing means and deenergization of the clamping means for feeding the sheared piece of metal from the path of feed of the strip metal.

References Cited by the Examiner

UNITED STATES PATENTS

| | | | |
|---|---|---|---|
| 1,889,546 | 11/32 | Gates | 242—75.5 |
| 2,214,355 | 9/40 | Tiselius | 242—75.51 |
| 2,346,194 | 4/44 | Sjostrom | 83—209 |
| 2,432,876 | 12/47 | Formhales | 242—75.52 |
| 2,458,612 | 1/49 | Luzzato et al. | 83—210 |
| 2,480,781 | 8/49 | Simpson | 83—263 X |
| 2,555,162 | 5/51 | Stanford | 242—75.5 |
| 2,742,963 | 4/56 | Klauss et al. | 83—65 |
| 2,792,890 | 5/57 | Dyken | 83—209 |
| 2,839,138 | 6/58 | Wilhelm | 83—264 |
| 2,898,995 | 8/59 | Funnell | 83—210 |

FOREIGN PATENTS 594,060  3/60  Canada.

ANDREW R. JUHASZ, *Primary Examiner.*

CARL W. TOMLIN, *Examiner.*